US011662801B2

(12) United States Patent
Srinivasan et al.

(10) Patent No.: US 11,662,801 B2
(45) Date of Patent: *May 30, 2023

(54) SUPERVISORY CONTROL OF POWER MANAGEMENT

(71) Applicant: MICROSOFT TECHNOLOGY LICENSING, LLC, Redmond, WA (US)

(72) Inventors: Harish Srinivasan, Sammamish, WA (US); Robert C. Combs, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/722,289

(22) Filed: Apr. 15, 2022

(65) Prior Publication Data
US 2022/0350394 A1 Nov. 3, 2022

Related U.S. Application Data

(63) Continuation of application No. 15/441,865, filed on Feb. 24, 2017, now Pat. No. 11,314,317.
(Continued)

(51) Int. Cl.
*G06F 9/38* (2018.01)
*G06F 9/48* (2006.01)
(Continued)

(52) U.S. Cl.
CPC ............ *G06F 1/3287* (2013.01); *G06F 1/266* (2013.01); *G06F 1/3203* (2013.01); *G06F 1/3209* (2013.01); *G06F 1/3228* (2013.01); *G06F 1/3234* (2013.01); *G06F 1/3278* (2013.01); *G06F 1/3296* (2013.01); *G06F 11/3048* (2013.01); *G06F 11/3051* (2013.01);
(Continued)

(58) Field of Classification Search
CPC ....... G06F 9/3869; G06F 9/4881; G06F 9/544
See application file for complete search history.

(56) References Cited

U.S. PATENT DOCUMENTS 6,457,134 B1* 9/2002 Lemke ................. G06F 1/3209
713/323
11,314,317 B2* 4/2022 Srinivasan ............. G06F 1/266
(Continued)

*Primary Examiner* — Zachary K Huson
(74) *Attorney, Agent, or Firm* — Newport IP, LLC; Jacob P. Rohwer

(57) ABSTRACT

A supervisory control system provides power management in an electronic device by providing timeout periods for a hardware component to lower levels of the operating system such as a power management arbitrator and/or a hardware interface controller. The power management arbitrator and/or hardware interface controller transition at least a portion of a hardware component to a lower-power state based on monitored activity information of the hardware component. The supervisory control system may further provide wakeup periods to the power management arbitrator and/or a hardware interface controller to determine whether the hardware component should be transitioned to a higher-power state at the end of the wakeup period if the hardware component satisfies a transition condition.

20 Claims, 8 Drawing Sheets

Related U.S. Application Data

(60) Provisional application No. 62/415,183, filed on Oct. 31, 2016, provisional application No. 62/415,228, filed on Oct. 31, 2016, provisional application No. 62/415,142, filed on Oct. 31, 2016.

(51) Int. Cl.

| | |
|---|---|
| *G06F 9/54* | (2006.01) |
| *G06F 1/3287* | (2019.01) |
| *G06F 1/3203* | (2019.01) |
| *G06F 1/3296* | (2019.01) |
| *G06F 1/3228* | (2019.01) |
| *G06F 1/3234* | (2019.01) |
| *G06F 11/34* | (2006.01) |
| *G06F 1/26* | (2006.01) |
| *G06F 1/3209* | (2019.01) |
| *G06F 11/30* | (2006.01) |

(52) U.S. Cl.
CPC ........ *G06F 11/3409* (2013.01); *G06F 9/3869* (2013.01); *G06F 9/4881* (2013.01); *G06F 9/544* (2013.01); *G06F 11/3423* (2013.01); *Y02D 10/00* (2018.01); *Y02D 30/50* (2020.08)

(56) References Cited

U.S. PATENT DOCUMENTS

| | | |
|---|---|---|
| 2018/0120917 A1 | 5/2018 | Srinivasan et al. |
| 2018/0120923 A1 | 5/2018 | Srinivasan |

* cited by examiner

SUPERVISORY CONTROL OF POWER MANAGEMENT

CROSS-REFERENCE TO RELATED APPLICATIONS

The present application claims benefit of priority to U.S. patent application Ser. No. 15/441,865, entitled "SUPERVISORY CONTROL OF POWER MANAGEMENT", filed on Feb. 24, 2017, which claims benefit of priority to: (i) U.S. Provisional Patent Application No. 62/415,142, entitled "USAGE PATTERN INFLUENCE ON POWER MANAGEMENT", filed on Oct. 31, 2016, (ii) U.S. Provisional Patent Application No. 62/415,183, entitled "DEVICE-AGGREGATING ADAPTIVE POWER MANAGEMENT", filed on Oct. 31, 2016, and (iii) U.S. Provisional Patent Application No. 62/415,228, entitled "SUPERVISORY CONTROL OF POWER MANAGEMENT", filed on Oct. 31, 2016, which are specifically incorporated by reference for all that they disclose and teach.

The present application is also related to U.S. patent application Ser. No. 15/441,693, entitled "USAGE PATTERN BASED SUPERVISORY CONTROL OF POWER MANAGEMENT," filed on Feb. 24, 2017, now U.S. Pat. No. 10,289,189, and U.S. patent application Ser. No. 15/441,778, entitled "AGGREGATED ELECTRONIC DEVICE POWER MANAGEMENT," filed Feb. 24, 2017, now U.S. Pat. No. 10,705,591, which are specifically incorporated by reference for all that they disclose and teach.

BACKGROUND

Power consumption management of the various system hardware components in a computing device, such as network adapters, display interfaces, input/output devices, cameras, etc., becomes more challenging as more computing devices become mobile and depend on battery power as a primary power source. Various modules in an operating system (OS) contribute to the management of power, such as deciding when a component may transition to a low-power mode. Applications and OS modules, however, can block system hardware components from going to low-power. For example, some computing systems rely on applications to register their use of a system device when the device is needed by the application and release the device when the application no longer needs to use the device. This arrangement can block the hardware component from going to low-power mode, even for a brief period, when the device is not in use because applications often do not reliably register and release their requests to use the hardware component. Often the device could have transitioned to a lower power state, thus drawing less power from the battery than if the device had not transitioned to a low-power state.

SUMMARY

The described technology provides supervisory control of power management in a computing device to determine when a system hardware component should transition to a low-power state. Supervisory control of power management by an OS includes a power management arbitrator, which may be at the lowest level of the operating system, to control transitions of the hardware devices between the various power states available to each of the devices. The operating system, in cooperation with hardware components (e.g., a network adapter), can detect when the system hardware component is not using a resource (e.g., network is idle) and transition to low-power, regardless of the level of active state the rest of the system or of the registration status for the hardware component of applications executing on the device. Effectively, this supervisory control seeks to increase probability that the power provided to the device is only used when the device is working (e.g., network adapter is transmitting or receiving network traffic), although some level of non-optimal power management may be expected.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

Supervisory control of power management allows a system hardware component (e.g., a network adapter, video adapter, input/output device, etc.) to transition to a low-power mode after all applications have relinquished use of the system hardware component for the duration of a timeout period (e.g., transmitting or receiving network communications, displaying video, audio output, etc.) even if some applications are still registered to use the hardware component. In one implementation, for example, supervisory control of power management can set (e.g., on a per component basis, per application basis, per OS module basis) variable timeout periods, designating a minimum period of time a system hardware component is inactive before triggering a transition of that system hardware component to a low-power state. In another implementation, supervisory control of power management can set (e.g., on a per component basis, per application basis, per OS module basis) variable wakeup periods, designating a maximum period of time a system waits before transitioning the system hardware component into a high-power state (or checking to determine whether such a transition should be triggered).

This disclosure describes the system and methods for effectively managing power for various system hardware components, including networking components and controlling the power state of network adapters. A result of the described technology is a refinement in power consumption by automating the reduction of system hardware component power consumption states during those periods when the system hardware component is not needed (e.g., transitioning a network adapter to a low-power or lower-power state when network traffic is not actually flowing), even if only for a very brief period of time without relying on applications executing on the device to release their use of the hardware component by notifying the operation system.

Various examples are described below with respect to the figures. These examples are merely exemplary, and implementations of the present disclosure are not limited to the examples described below and illustrated in the figures.

Figure 1:
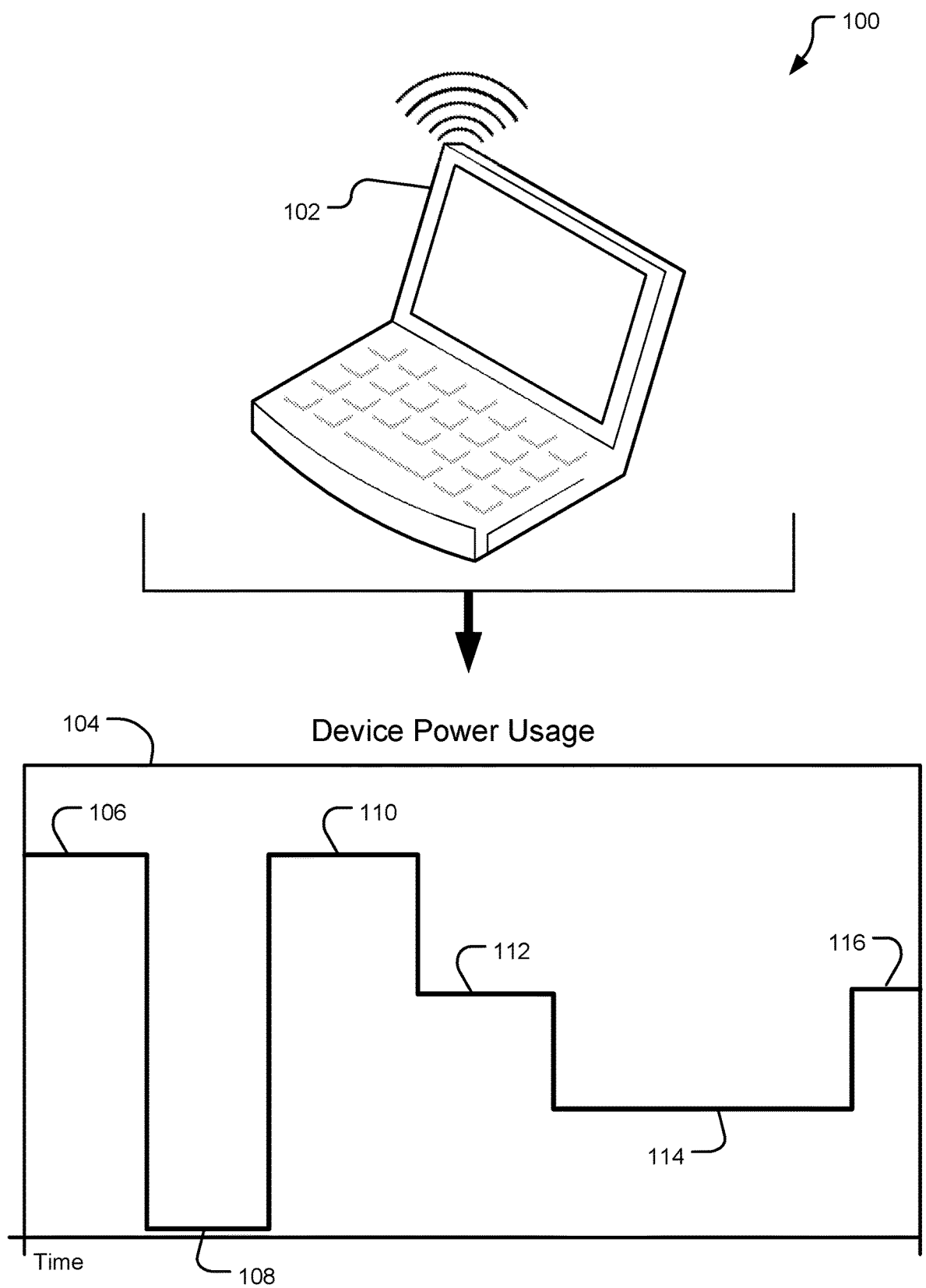
FIG. 1 illustrates an example environment for supervisory control of power management of a device with a power usage plot.

FIG. 1 illustrates an example environment 100 for supervisory control of power management of a device 102 with a power usage plot 104. The device 102 is an electronic device with an OS and one or more system hardware components (not shown) that are capable of transitioning between one or more high-power modes and low-power modes. In at least some implementations the one or more system hardware components of device 102 are capable of multiple power modes, including intermediate power modes between a high-power mode and a low-power mode. For example, a system hardware component may have one or more onboard processors for that may be turned off in a low-power mode, limited to a speed below full capacity in an intermediate power mode, and allowed to run at full speed in a high-power mode. As used herein, "power mode" and "power state" refer to the energy consumption of a system hardware component relative to the maximum amount of power the system hardware component is capable of consuming. Power states may be referred to as "higher-power" and/or "lower-power" states to indicate that a power state is higher or lower than another power state without necessarily implying that the power state is the highest or lowest power state that the system hardware component is capable of. Other implementations may include additional power modes to provide a finer control over supervisory power management.

Device 102 includes a power management supervisory controller and a power management arbitrator. In an implementation, the power management supervisory controller is associated with a higher level of the OS on the device 102 and the power management arbitrator is associated with a lower level of the OS on the device 102. The power management arbitrator may transition system hardware components between various power modes by controlling a hardware sublayer, a hardware driver, and/or a component of the data link layer of the OS associated with the hardware system device. In an implementation, the power management arbitrator need not communicate with the power management supervisory controller or other components of the OS on electronic device 102 to effect power state transitions of system hardware components.

The OS of device 102 manages the applications in the system that utilize system services, including, for example, network services, video display, audio output, etc. Network adapters will be a focus of the description herein, but the supervisory power management features described may apply to any other system hardware components as well.

Hence, the OS is aware whether the network will be needed by monitoring applications and OS modules that depend on the network adapter. This management represents a supervisory state that the OS of device 102 can apply to individual network adapters, based on the need for each rather than relying on registration of application for the network adapters. As applications begin and end execution, the OS tracks the hardware component's overall network need, which network devices (or media) are needed, and the load status of the network devices. The OS of device 102 informs a component such as a low-level OS arbitrator, an NDIS API, and/or a miniport driver whether the network is needed by the applications. If the network is not needed, the network adapter is transitioned to low-power.

When the OS of device 102 indicates that the network is needed by applications or services, the OS still does not know the actual network demand. The system applications and operating modules calling for network usage therefore benefit from a separation of higher-level components of the OS of device 102 from the low-level OS components such as the network adapter, arbitrator, etc. Accordingly, network adapter power management can be controlled at the lowest possible layer in the network stack. If the upper-level OS indicates that network services are not needed, the network adapter can be transitioned to low-power. However, when the OS indicates that applications or services do require the network, it is still possible, or even likely, that there are periods where the network is not actually needed because applications often register with the OS for control of a system hardware component even if it is not needed for periods of time by the application. During these periods of network inactivity, the network adapter can be transitioned to low-power. Usually, these periods of inactivity are quite short, often several such periods per second. The sum of these inactive periods is typically larger than the periods of actual network use. Transitioning to low-power for these periods saves a significant portion of power the network adapter would otherwise be using.

Decoupling the management of network power state and actual network adapter power state is controllable from both a system-wide and per-device basis. In devices that respond poorly to idle detection power transitions of system hardware components, a system-wide override will mitigate poor idle detections. Similarly, individual device manufacturers may deem it risky to allow the duty cycle of power transitions to negatively impact their devices. Other reasons also exist for not wanting a particular device to respond to idle detection power transitions. Hence, a mechanism exists for device vendors to override idle detection operating against their devices.

Determining whether a system hardware component of device 102 is idle may be done per one or more algorithms that can be used separately or in various combinations. In one implementation, a fixed or variable timeout period may be used to determine whether a system hardware component is idle. In the example of a network device, the trigger to transition to a low-power state is when the network is idle for a timeout period. Typically, the length of the timeout period is dependent on the latency of the network adapter startup and the power consumed during transitions versus steady state operation. For example, a system hardware component with a shorter startup time that consumes relatively little power when transitioning between a low-power and a high-power state compared to remaining in a high-power state may weigh in favor of a shorter timeout period to avoid leaving the system hardware component in a high-power state when it is not needed.

As used herein, an inactivity condition may refer to a level of activity of a hardware component that is zero, near-zero, or below a threshold level of activity. For example, a network adapter may satisfy an inactivity condition if it transmits or receives no packets to or from a host during a time period even if the network adapter is performing other functions such as running a timeout and/or wakeup timer, "listening" for certain types of packets, and/or communicating with a host. In some implementations, a network adapter may send or receive packets on behalf of a host during a timeout period and still satisfy the inactivity condition if the number and/or type of packets are below a threshold value.

As used herein, a transition condition may depend on a timeout period and the activity of a hardware component during that period. For example, a transition condition may be satisfied if an inactivity condition is satisfied during a timeout period. In some implementations, a transition condition may be satisfied if a hardware component satisfies an inactivity condition during a timeout period and there are no applications that have indicated a need to use the hardware component in a time period after the timeout period. In another implementation, a transition condition may be satisfied if a hardware component doesn't satisfy an inactivity condition during a timeout period but user preferences indicate an aggressive power saving preference wherein a hardware component should be deemed to have satisfied the transition condition if the hardware component's activity during the timeout period is below a predetermined level or if the hardware component's activity is of a certain type during the timeout period. In another implementation, a transition condition is satisfied when there is no monitored activity information during the timeout period and the hardware component is idle at the end of the timeout period. In another implementation, a transition condition is satisfied when the hardware component has a maximum amount of activity during the timeout period. Other elements of the transition condition may also be used.

In another implementation, a fixed or variable wakeup period may be used to determine whether a system hardware component of device 102 that has been in a low-power state may be transitioned to a high-power state or to re-check whether operating conditions have changed sufficiently to justify a transition to a high-power state. The length of the wakeup period may be dependent on the latency of the network adapter startup and the power consumed during transition of the system hardware component compared to steady state operation. For example, a system hardware component with a longer startup time that consumes significantly more power when transitioning between a low-power and high-power state compared to remaining in a high-power state may weigh in favor of a longer wakeup period to avoid excessively waking the device.

In another implementation, the length of the timeout period to trigger the transition of a system hardware component of device 102 (e.g., a network adapter) to a low-power state when the network is idle and/or the length of the wakeup period to trigger the transition of the system hardware component from a low-power state to a high-power state may be determined by the class/type of applications running on the device. For example, video streaming application that burst short portions of network traffic may be optimized for different timeout periods and wakeup periods than audio application that download one song at a time and then remain idle until the next song downloads. In at least one implementation, a low-level arbitrator may determine the relevant time periods without resort to high-levels of the operating system.

In another implementation, the length of the timeout period to trigger the transition of a system hardware component of device 102 (e.g., a network adapter) to a low-power state when the network is idle and/or the length of the wakeup period to trigger the transition of the system hardware component from low-power to a high-power state may be determined based on the durations of recent periods, in the case of a network adapter, of network transmission compared to periods of network idle. If a set of recent periods of network transmission are cached, then a weighted algorithm or a decaying value algorithm may be used to determine the length of upcoming expected periods of network transmission for which the system hardware component (e.g., the network adapter) should be in a high-power state.

In another implementation, the length of the timeout period to trigger the transition of a system hardware component (e.g., a network adapter) of device 102 to a low-power state when the network is idle and/or the length of the wakeup period to trigger the transition of the system hardware component from low-power to a high-power state may be determined based on an available battery state. As such, the length of the timeout and/or wakeup periods may become more aggressive as the remaining battery power declines. The aggressiveness of the lengths of the timeout period and wakeup period is limited by the baseline power consumed by transitions.

In another implementation, the length of the timeout period to trigger the transition of a system hardware component (e.g., a network adapter) of device 102 to a low-power state when the network is idle and/or the length of the wakeup period to trigger the transition of the system hardware component from low-power to a high-power state may be determined based on feedback from a system hardware component. In the case of a network adapter, the responsiveness of the network adapter to transitions between low-power and high-power states and the power consumer by the network adapter in transitioning between those states may be communicated though the network driver to the OS to determine an optimal length of time for the timeout period and/or the wakeup period. In another implementation, an OS on the electronic device may measure other characteristics of the hardware component to determine an optimal length of time for the timeout period and/or wakeup period, such as, for example, measuring the speed of a network adapter.

In another implementation, the length of the timeout period to trigger the transition of a system hardware component (e.g., a network adapter) of device 102 to a low-power state when the network is idle and/or the length of the wakeup period to trigger the transition of the system hardware component from low-power to a high-power state may be determined based on user input. An OS may allow the user to input information to the OS regarding the nature of the length of the timeout period to be used. If the available battery power of the device reaches a threshold, the OS may present a user interface to the user to collect a "hint" from the user regarding the user's power management preferences. For example, if a user wishes for a system hardware component to have good performance, the user may select a less aggressive timeout and/or wakeup period to preserve performance at the cost of remaining battery life. On the other hand, a user may select a more aggressive timeout and/or wakeup period if the user wishes to maximize battery life at the cost of performance due to more frequent transitions between high and low-power states of a system hardware component.

In another implementation, the length of the timeout period to trigger the transition of a system hardware component (e.g., a network adapter) of device 102 to a low-power state when the network is idle and/or the length of the wakeup period to trigger the transition of the system hardware component from low-power to a high-power state may be determined based on the input of an arbiter. The power management arbitrator is a low-level OS module that determines the contribution and effect of the various available algorithms for determining the length of the timeout and/or wakeup periods.

In another implementation, the length of the timeout period to trigger the transition of a system hardware component (e.g., a network adapter) of device 102 to a low-power state when the network is idle and/or the length of the wakeup period to trigger the transition of the system hardware component from low-power to a high-power state may be determined based on application type usage and/or the state of the application. If an application has registered with the OS to use the system hardware component, then the timeout period may be set based on the expected needs of the application with respect to the system hardware component. For example, if a multi-player online game application has registered with the OS to use the network adapter, then a longer timeout period may be set because network latency in an online gaming application is likely to degrade the user experience due to lag between the user and other players in the game. If the state of the online gaming application changes, however, then a longer timeout period may be more appropriate. For example, if the user becomes inactive in the game and appears to be taking a break from play, then the lag issue is not as important as when the player was actively engaged, and a longer timeout period may be acceptable. Other examples of application type and application state affecting the timeout and/or wakeup period include a video application that is displaying video at a requested framerate to the user. If the video application is playing the video, it may be assumed that the user is watching the video and the video adapter should not be transitioned to a low-power state. On the other hand, if the user pauses the video and/or selects the windows of other applications executing on the device (e.g., the video application window is partially or completely obscured by other windows), then a shorter timeout period may be appropriate. In an implementation, the video adapter has multiple intermediate power modes such that the video adapter may be transitioned into an intermediate power state to support video applications that do not demand a high frame rate.

Implementations of the present application include a network power module, integrated within an operating system of device 102, which controls the use of networking hardware during various power states of a device. Applications register with the network power module. The network power module accesses a policy store to determine a priority of the application. The application's priority may be static or configurable. The network power module also determines a power state of the device, which may be defined in various ways without departing from the scope of implementations. The network power module-based on power state, application priority, or other factors such as remaining battery power, application state, device user interface (UI) state—enables the network communication hardware to be powered up to receive and transmit data.

In some implementations, the network power module sets a timer in certain power states—such as in high-power states. The timer establishes a timeout period, which may be adaptable, during which the device and/or the network communication hardware remains powered up and traffic may be sent. After the timeout timer expires, the device and/or the network communication hardware revert into a low-power state. The arrival of additional high-priority traffic may cause a currently running timer to increase remaining time or to be reset, to give more time for the traffic to be transmitted. Low-priority traffic may be transmitted or received during the timer period. Low-priority traffic may be queued for transmission until the communication hardware is activated. In some implementations, lower-priority traffic may cause the network power module to activate the network communications hardware if a threshold amount of lower-priority traffic queues for transmission. The timeout period may be adjustable based on application operational requirements, upper-level OS operational requirements, hardware component activity, and other factors.

In some implementations, the network power module sets a timer in certain power states—such as in low-power states. The timer establishes a wakeup period, which may be adaptable, during which the device and/or the network communication hardware remains in a low-power state. After the wakeup timer expires, the device and/or the network communication hardware revert into a high-power state or re-evaluated operational information and hardware device activity to determine whether to transition to a high-power state, to adjust a timeout period or to adjust the wakeup period. Detected hardware device activity or high-priority demand (e.g., by an application or OS module) may trigger a transition to a high-power state independent of the state of the wakeup period time. The wakeup period may be adjustable based on application operational requirements, upper-level OS operational requirements, hardware component activity, and other factors.

Plot 104 illustrates an overall power usage level of the device 102 during various phases of operation. The y-axis of plot 104 indicates overall power usage level of the device 102 and the x-axis of plot 104 indicates time. Point 106 illustrates a period of time during which the device 102 is consuming a higher level of power. Point 108 illustrates a period of time during which the device 102 is consuming a low level of power due to the transitioning of one or more system hardware components to a low-power mode, such as, for example, after the expiration of a timeout period. Point 110 illustrates a return to higher level of power consumption by device 102, such as, for example, at the end of a wakeup period of one or more system hardware components. Point 112 illustrates a medium level of power consumption by device 102, such as when one or more system hardware components have been transitioned to a low-power mode, but not as many system hardware components as were transitioned at point 108. Alternatively, point 112 may illustrate a power consumption level represented by one or more system hardware components in an intermediate power state that is between a high-power state and a low-power state. Point 114 illustrates a return to a lower level of power consumption by device 102, such as when a user has indicated a preference for longer battery time over performance and an arbitrator has transitioned one or more system hardware components into low-power states. Point 116 illustrates an increase in power consumption by device 102, such as when a wakeup period has concluded and one or more system hardware components transition into higher-power modes.

Figure 2:
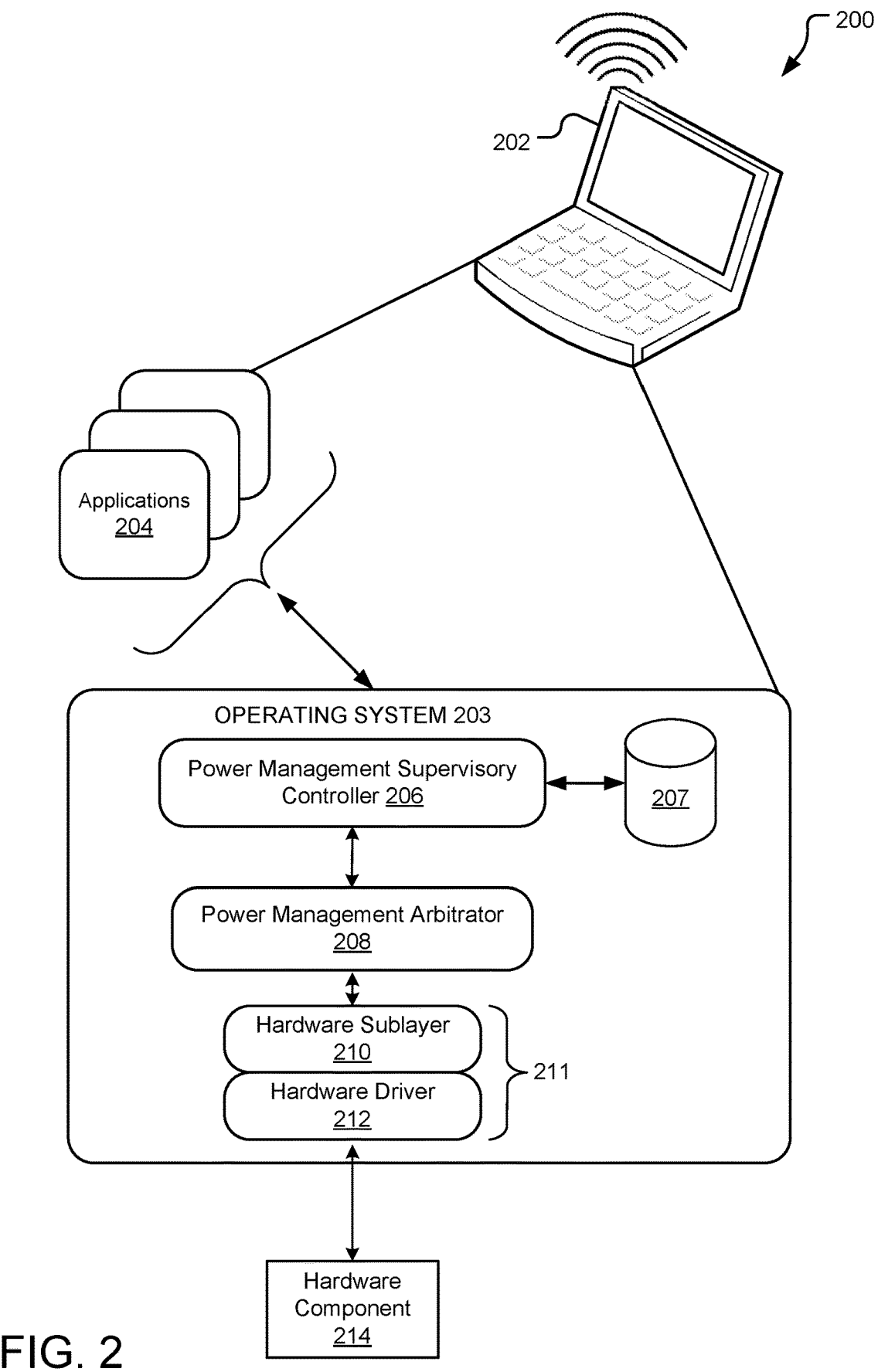
FIG. 2 illustrates an example environment for supervisory control of power management on a device.

FIG. 2 illustrates an example environment 200 for supervisory control of power management on a device 202. The device 202 includes an OS 203 and a variety of applications 204 executing thereon. The applications 204 may include components of the OS as well as other executable applications. Some of the applications 204 seek to use resources provided by a hardware component 214 that is part of the device 202. Requests from the applications 204 to use hardware component 214 are managed by a power management supervisory controller 206. In an implementation, the power management supervisory controller is a part of the OS. If there are no pending requests to use hardware component 214 from the applications 204, then the power management supervisory controller 206 can direct the hardware component 214 to transition to a low-power state. A command to transition the hardware component 214 may be communicated from the power management supervisory controller 206 to the hardware component via one or more intermediate levels. In an implementation, the intermediate levels include a power management arbitrator 208, a hardware sublayer 210, and a hardware driver 212. The hardware sublayer and hardware driver may be referred to herein as the hardware interface controller 211, which may include a combination of hardware and software components.

If there are pending requests from the applications 204 to use the hardware component 214, then the power management supervisory controller may not be aware of the true demand for the hardware component 214 because applications 204 may register with the power management supervisory controller 206 to use the hardware component 214 without necessarily using the hardware component 214 or may only use the hardware component sporadically or with a usage pattern that leaves the hardware component 214 idle for periods of time. Accordingly, the power management supervisory controller 206 may delegate power management decisions to a lower level of the OS (e.g., the power management arbitrator 208). The power management arbitrator 208 monitors the load on the hardware component 214 and the applications 204 that are using the hardware component 214. The power management arbitrator 208 may independently transition the hardware component 214 to a low-power state (or an intermediate lower power state) for periods of time during which the hardware component 214 would not have been transitioned to a low-power state if the transitioning decision had been based on registrations of applications 204 to use the hardware component 214.

In at least one implementation, the power management supervisory control is in communication with a data store 207. The data store 207 contains a variety of information regarding timout periods that are available for use by the power management supervisory control 206, which may be implemented by the power management supervisory control 206 directly or delegated to the power management arbitrator 208 or other lower levels of the OS 203. The data store 207 may include tables of timeout periods with timeout periods associated with particular applications 204. In one implementation, the power management supervisory control 206 selects a timeout period from a plurality of timeout periods in data store 207 to pass to the power management arbitrator 208. For example, the power management supervisory control 206 may select the longest timeout period from a set of timeout periods corresponding to the applications 204 running on OS 203 as the timeout period the power management arbitrator 208 should use for a hardware component 214.

In at least one implementation, the power management supervisory control is in communication with a data store 207. The data store 207 contains a variety of information regarding timeout periods that are available for use by the power management supervisory control 206, which may be implemented by the power management supervisory control 206 directly or delegated to the power management arbitrator 208 or other lower levels of the OS 203. The data store 207 may include tables of timeout periods with timeout periods associated with particular applications 204. In one implementation, the power management supervisory control 206 selects a timeout period from a plurality of timeout periods in data store 207 to pass to the power management arbitrator 208. For example, the power management supervisory control 206 may select the longest timeout period from a set of timeout periods corresponding to the applications 204 running on OS 203 as the timeout period the power management arbitrator 208 should use for a hardware component 214.

In at least one implementation, the power management supervisory control is in communication with a data store 207. The data store 207 contains a variety of information regarding timeout periods that are available for use by the power management supervisory control 206, which may be implemented by the power management supervisory control 206 directly or delegated to the power management arbitrator 208 or other lower levels of the OS 203. The data store 207 may include tables of timeout periods with timeout periods associated with particular applications 204. In one implementation, the power management supervisory control 206 selects a timeout period from a plurality of timeout periods in data store 207 to pass to the power management arbitrator 208. For example, the power management supervisory controller 206 may select the longest timeout period from a set of timeout periods corresponding to the applications 204 running on OS 203 as the timeout period the power management arbitrator 208 should use for a hardware component 214.

In at least one implementation, the power management supervisory controller is in communication with a data store 207. The data store 207 contains a variety of information regarding timeout periods that are available for use by the power management supervisory controller 206, which may be implemented by the power management supervisory controller 206 directly or delegated to the power management arbitrator 208 or other lower levels of the OS 203. The data store 207 may include tables of timeout periods with timeout periods associated with particular applications 204. In one implementation, the power management supervisory controller 206 selects a timeout period from a plurality of timeout periods in data store 207 to pass to the power management arbitrator 208. For example, the power management supervisory controller 206 may select the longest timeout period from a set of timeout periods corresponding to the applications 204 running on OS 203 as the timeout period the power management arbitrator 208 should use for a hardware component 214. In at least one implementation, the power management supervisory controller 206 queries one or more applications 204 for preferred timeout periods associated with the hardware component 214 and stores the preferred timeout periods associated with the hardware component 214 in the data store 207.

In an implementation, the power management arbitrator 208 sets a timeout period for the hardware component 214. If there is no activity on the hardware component 214 during the timeout period, then the power management arbitrator 208 causes the hardware component 214 to transition to a low-power (or lower power) mode. The length of the timeout period for hardware component 214 may be chosen according to the algorithms disclosed herein. Control of the power state of the hardware component 214 and setting the timeout period of the hardware component 214 (and other hardware components that are part of the device 202) may be on a per device basis, a per application or application type basis, on a battery status basis, on a user preference basis, on a device feedback basis, on a recent history basis, etc. The power management supervisory controller 206 may further set a wakeup period for the hardware component 214 according to the algorithms disclosed herein. Control of the power state of the hardware component 214 and setting the wakeup period of the hardware component 214 (and other hardware components that are part of the device 202) may also be on a per device basis, a per application or application type basis, on a battery status basis, on a user preference basis, on a device feedback basis, on a recent history basis, etc.

In at least one implementation, the power management arbitrator 208 causes the hardware component 214 to transition between power modes by communicating with a hardware sublayer 210 and/or a hardware driver 212. In the case where the hardware component 214 is a network adapter, the hardware sublayer 210 may be an NDIS API and the hardware driver 212 may be a miniport driver. Other hardware sublayers 210 and hardware drivers 212 may be appropriate for other types of hardware components 214. In an implementation, the power management arbitrator may set a timer in one of the lower levels (e.g., the hardware sublayer 210 and/or the hardware driver 212) to manage transitioning the hardware component 214 to a low-power mode such that the hardware sublayer 210 and/or the hardware driver 212 will transition the hardware component 214 to the low-power mode without action by the power management arbitrator 208, the power management supervisory controller 206, or other parts of the OS 203.

In at least one implementation, the power management supervisory controller 206 communicates with a policy store that stores priority information for one or more applications executing on OS 203. The priority information in the priority store may be static or configurable. Where configurable, the priority of an application may be configured by a user (such as during or after install), by a group policy, or by another mechanism. Some applications may have a statically assigned priority. Based on the application priority in the priority store and the power state of the device 202, the power management supervisory controller 206 may set timeout and wakeup periods, responsive to the requests or attempts from the applications executing on OS 203 to use the hardware component 214.

Figure 3:
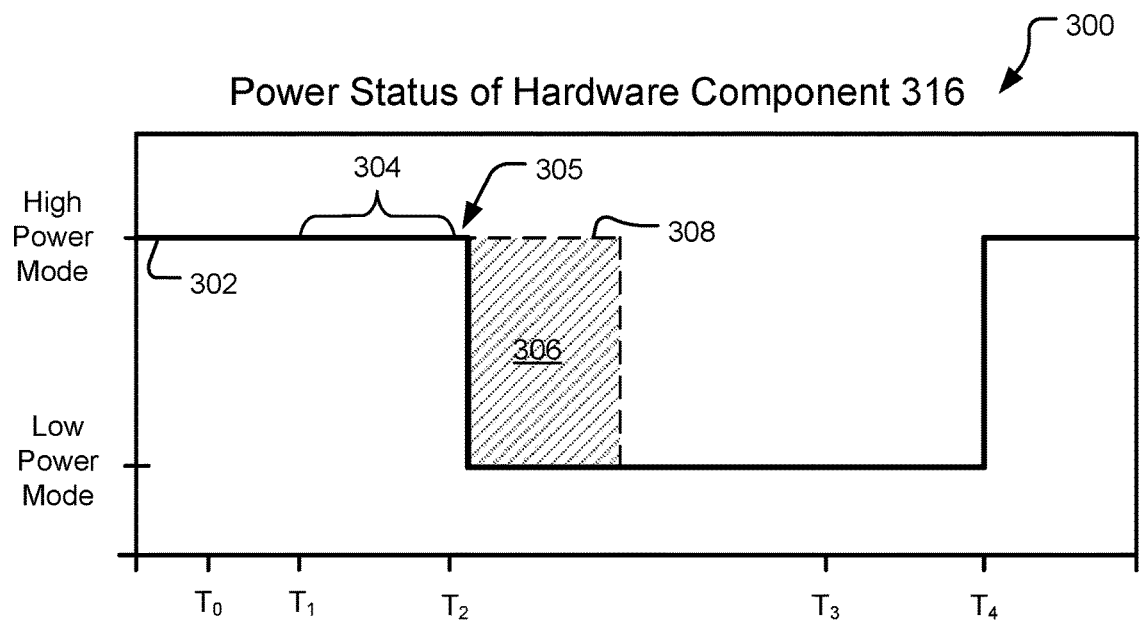
FIG. 3 is a plot of example power usage of a hardware component and a signal diagram illustrating interaction between the components of a device under a supervisory control of power management environment.
Figure 3:
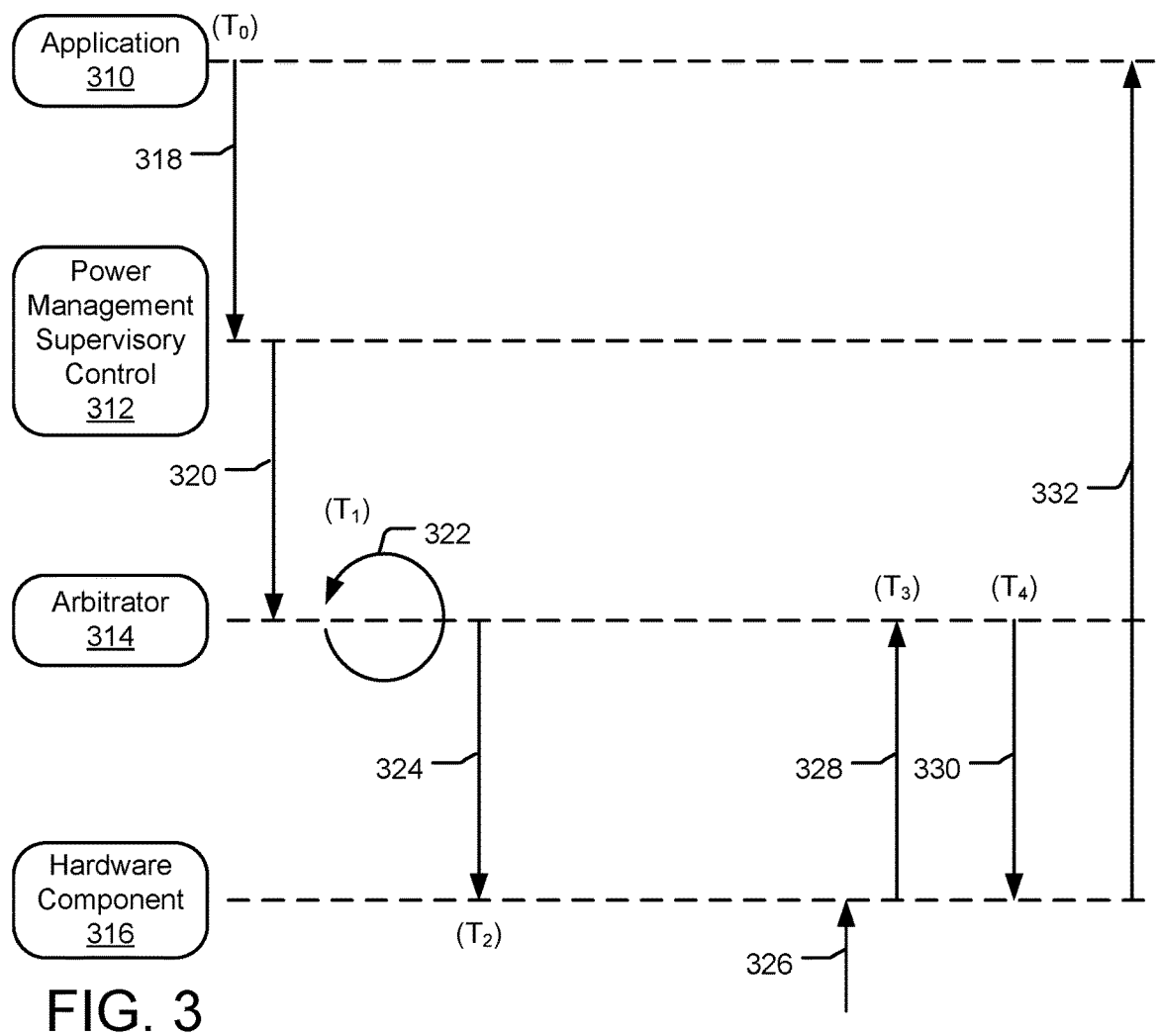

FIG. 3 is a plot of example power usage of a hardware component 316 and a signal diagram illustrating interaction between the components of a device under a supervisory control of power management environment 300. The plot includes a line 302 indicating whether the hardware component 316 is in a high-power mode or a low-power mode. In other implementations, the hardware component 316 has more than two power modes. The two power modes of the hardware component 316 used herein are exemplary. The x-axis of the plot indicates time, and the time markers $T_0$-$T_4$ are on the same scale as the communications shown in the signal diagram below the plot.

At a time $T_0$, an application 310 executing on the computing device communicates a request to use the hardware component 316 to the OS of the device. The request to use hardware component 316 is received in communication 318 by the power management supervisory controller 312. Shortly after time $T_0$, the power management supervisory controller 312 informs the arbitrator 314 of information regarding the request from application 310 to use hardware component 316 in communication 320.

Communication 320 may include a variety of information regarding application 310 and the request to use hardware component 316 such as application 310's type, information regarding power management user preferences, historical power management information regarding the device and/or application 310, current battery status, etc. Communication 320 may also include a timeout period for hardware component 316. In another implementation, communication 320 does not include a timeout period for hardware component 316.

At time $T_1$, the timeout period 304 for hardware component 316 begins. In an implementation, during the timeout period 304, the arbitrator 314 monitors usage of the hardware component 316 at operation 322. If the hardware component 316 is not used during the timeout period 304, then the arbitrator 314 transitions the hardware component 316 into a low-power mode at time $T_2$ via communication 324. A time shortly after time $T_2$ indicated by the arrow 305, the hardware component 316 is in a low-power mode as indicated by line 302.

Transitioning the hardware component 316 to a low-power mode at time $T_2$ is an improvement over other methods of power management that rely on application 310 to de-register its use of hardware component 316. The additional savings of supervisory power management in the form of an earlier transition of hardware component 316 is shown on the plot as area 306. Dashed line 308 indicates what the power status of hardware component 316 would have been if the device had relied on the application 310 to announce its relinquishment of the hardware component 316 instead of using the methods of supervisory power management disclosed herein.

In an implementation, the hardware component 316 may "listen" for an event that can trigger the hardware component 316 to transition to a different power mode. For example, if the hardware component 316 is a network adapter, the network adapter may scan only the headers of network packets for an indication that the hardware component 316 should wake up even though the hardware component 316 is in a low-power mode. Such a packet may be referred to as a "wake packet" received in communication 326. Upon receipt of the wake packet in communication 326, the hardware component 316 informs the arbitrator 314 in communication 328 at time $T_3$. In an implementation, the arbitrator may itself transition the hardware component 316 into a higher-power state in communication 330 at time $T_4$ without relaying the hardware component 316's receipt of the wake packet to higher levels of the OS, e.g., the power management supervisory controller 312, the application 310, or other parts of the OS. Upon receipt of communication 330 from the arbitrator 314 at time $T_4$, the hardware component 316 transitions to a higher-power mode and communicates network traffic to the application 310 in communication 332.

Figure 4:
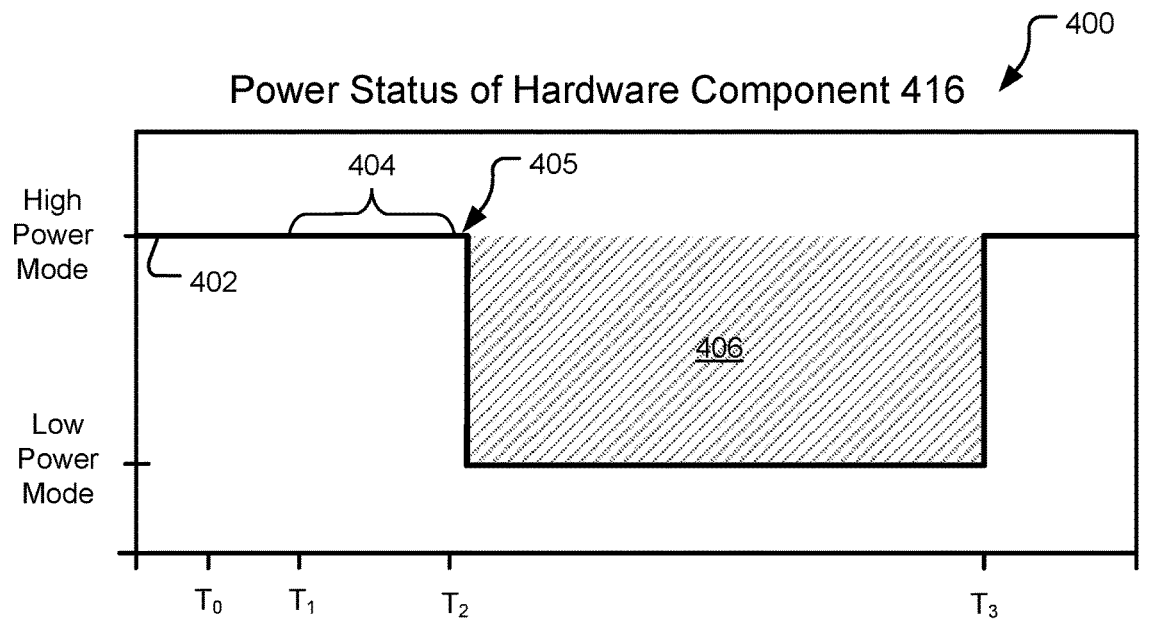
FIG. 4 is a plot of example power usage of a hardware component and a signal diagram illustrating interaction between the components of a device under a supervisory control of power management environment.
Figure 4:
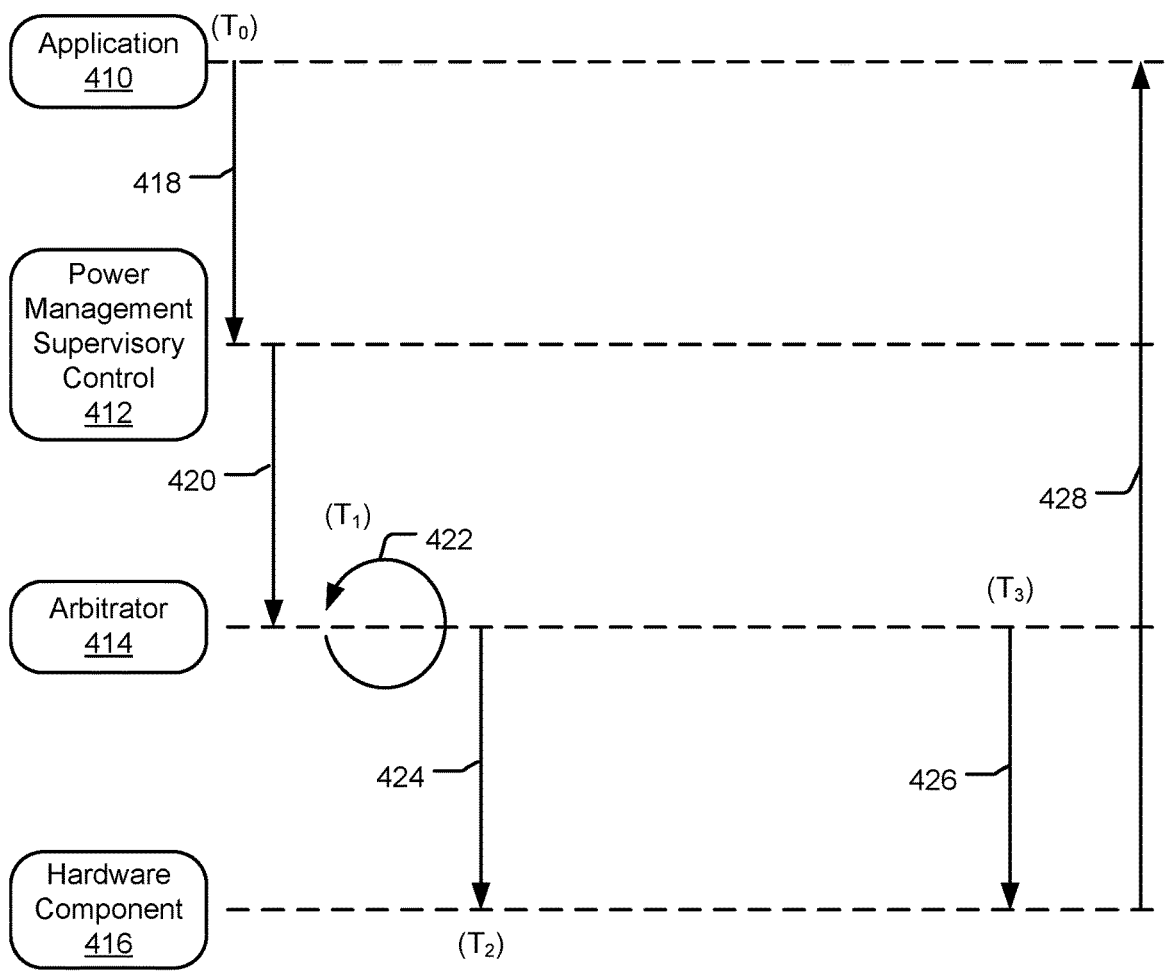

FIG. 4 is a plot of example power usage of a hardware component 416 and a signal diagram illustrating interaction between the components of a device under a supervisory control of power management environment 400. The plot includes a line 402 indicating whether the hardware component 416 is in a high-power mode or a low-power mode. In other implementations, the hardware component 416 has more than two power modes. The two power modes of the hardware component 416 used herein are exemplary. The x-axis of the plot indicates time, and the time markers $T_0$-$T_3$ are on the same scale as the communications shown in the signal diagram below the plot.

At a time $T_0$, an application 410 executing on the computing device communicates a request to use the hardware component 416 to the OS of the device. The request to use hardware component 416 is received in communication 418 by the power management supervisory controller 412. Shortly after time $T_0$, the power management supervisory controller 412 informs the arbitrator 414 of information regarding the request from application 410 to use the hardware component 416 in communication 420.

Communication 420 may include a variety of information regarding application 410 and the request to use hardware component 416 such as application 410's type, information regarding power management user preferences, historical power management information regarding the device and/or application 410, current battery status, etc. Communication 420 may also include a timeout period for hardware component 416. In another implementation, communication 420 does not include a timeout period for hardware component 416.

At time $T_1$, the timeout period 404 for hardware component 416 begins. In an implementation, during the timeout period 404, the arbitrator 414 monitors usage of the hardware component 416 at operation 422. If the hardware component 416 is not used during the timeout period 404, then the arbitrator 414 transitions the hardware component 416 into a low-power mode at time $T_2$ via communication 424. A time shortly after time $T_2$ indicated by arrow 405, the hardware component 416 is in a low-power mode as indicated by line 402.

After the hardware component 416 has been transitioned to a low-power mode at time $T_2$, the arbitrator 414 sets a wakeup period 406 for the hardware component 416 represented by area 406 on the plot. The wakeup period 406 ends at time $T_3$ and arbitrator 414 sends a wakeup signal to hardware component 416 in communication 426. In one implementation, communication 426 transitions the hardware component 416 from the low-power mode to a high-power mode as indicated by line 402. In another implementation, communication 426 simply transitions hardware component 416 into an intermediate power mode (not shown on the plot) wherein the hardware component 416 checks to see whether there is a pending request from application 410, any other applications, the OS, or other components of the computing device to use the hardware component 416. If there is such a request, then hardware component 416 may remain in the high-power mode as shown by line 402 in the plot. If there is not such a request, then hardware component 416 may return to the low-power mode. If the hardware component 416 remains in the high-power mode, it may communicate with application 410 at communication 428.

Figure 5:
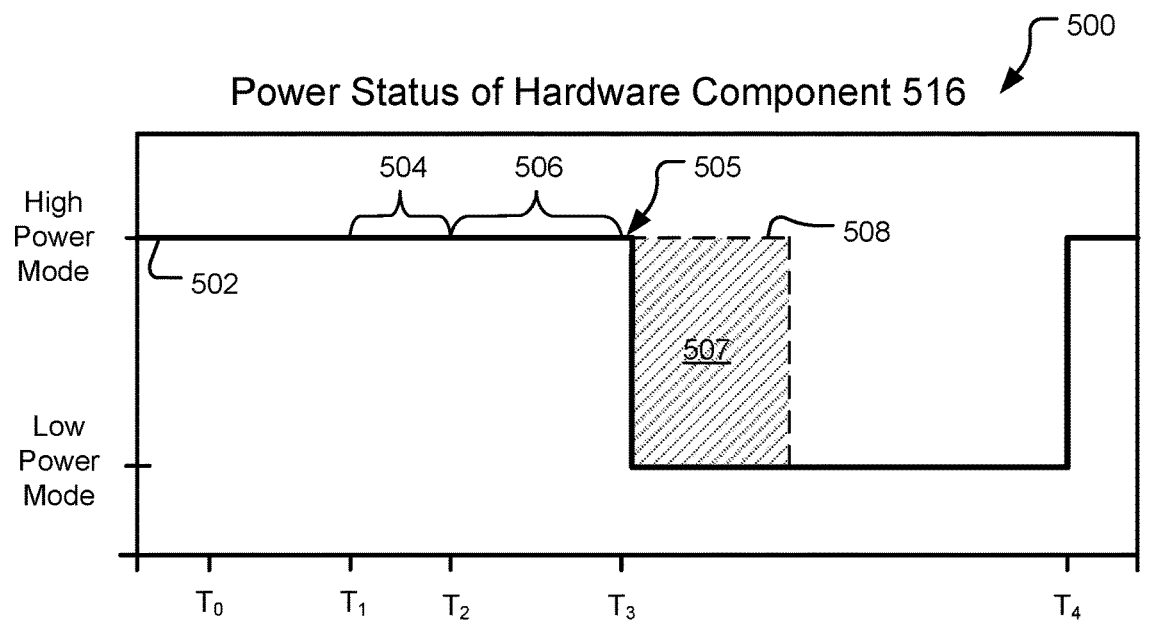
FIG. 5 is a plot of example power usage of a hardware component and a signal diagram illustrating interaction between the components of a device under a supervisory control of power management environment.
Figure 5:
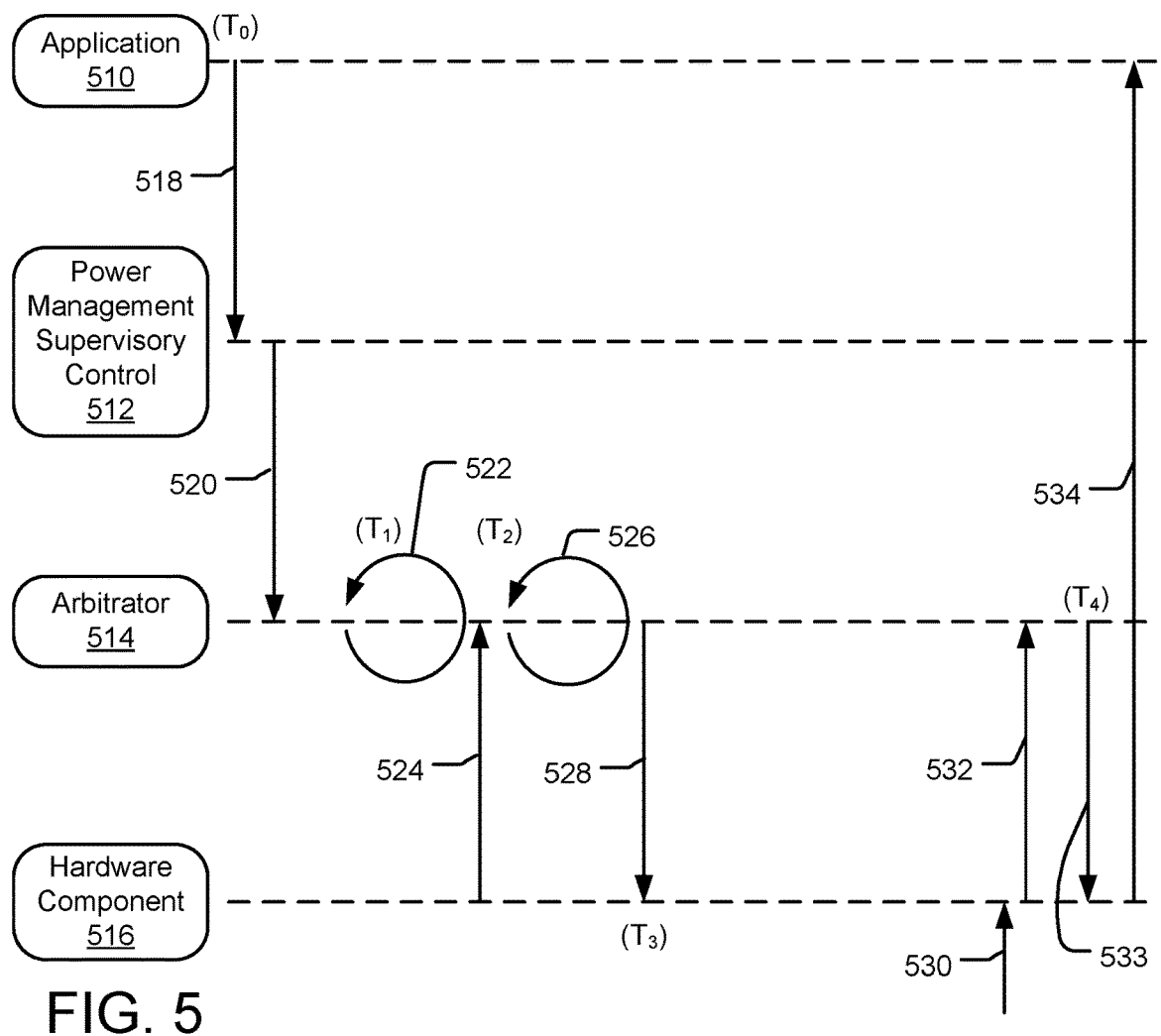

FIG. 5 is a plot of example power usage of a hardware component 516 and a signal diagram illustrating interaction between the components of a device under a supervisory control of power management environment 500. The plot includes a line 502 indicating whether the hardware component 516 is in a high-power mode or a low-power mode. In other implementations, the hardware component 516 has more than two power modes. The two power modes of the hardware component 516 used herein are exemplary. The x-axis of the plot indicates time, and the time markers $T_0$-$T_4$ are on the same scale as the communications shown in the signal diagram below the plot.

At a time $T_0$, an application 510 executing on the computing device communicates a request to use the hardware component 516 to the OS of the device. The request to use hardware component 516 is received in communication 518 by the power management supervisory controller 512. Shortly after time $T_0$, the power management supervisory controller 512 informs the arbitrator 514 of information regarding the request from application 510 to use hardware component 516 in communication 520.

Communication 520 may include a variety of information regarding application 510 and the request to use hardware component 516 such as application 510's type, information regarding power management user preferences, historical power management information regarding the device and/or application 510, current battery status, etc. Communication 520 may also include a timeout period for hardware component 516. In another implementation, communication 520 does not include a timeout period for hardware component 516.

At time $T_1$, a first timeout period 504 for hardware component 516 begins. In an implementation, during the first timeout period 504, the arbitrator 514 monitors usage of the hardware component 516 at operation 522. During operation 522, the hardware component 516 becomes active at time $T_2$ and notifies the arbitrator 514 of the activity in communication 524. Receipt of communication 524 triggers the arbitrator 514 to reset the timeout period at time $T_2$ to a second timeout period 506. During the second timeout period 506, the arbitrator 514 monitors usage of the hardware component 516 at operation 526. If the hardware component 516 is not used during the timeout period 506, then the arbitrator 514 transitions the hardware component 516 into a low-power mode at time $T_3$ via communication 528. A time shortly after time $T_3$ as indicated by arrow 505, the hardware component 516 is in a low-power mode as indicated by line 502.

Transitioning the hardware component 516 to a low-power mode at time $T_3$ is an improvement over other methods of power management that rely on application 510 to de-register its use of hardware component 516. The additional savings of supervisory power management in the form of an earlier transition of hardware component 516 is shown on the plot as area 507. Dashed line 508 indicates what the power status of hardware component 516 would have been if the device had relied on the application 510 to announce its relinquishment of the hardware component 516 instead of using the methods of supervisory power management disclosed herein.

In an implementation, the hardware component 516 may "listen" for an event that can trigger the hardware component 516 to transition to a different power mode. For example, if the hardware component 516 is a network adapter, the network adapter may scan only the headers of network packets for an indication that the hardware component 516 should wake up even though the hardware component 516 is in a low-power mode. Such a packet may be referred to as a "wake packet" received in communication 530. Upon receipt of the wake packet in communication 530, the hardware component 516 informs the arbitrator 514 in communication 532 at time $T_4$. In an implementation, the arbitrator may itself transition the hardware component 516 into a higher-power state in communication 533 at time $T_4$ without relaying the hardware component 516's receipt of the wake packet to higher levels of the OS, e.g., the power management supervisory controller 512, the application 510, or other parts of the OS. Upon receipt of communication 533 from the arbitrator 314 at time $T_4$, the hardware component 516 transitions to a higher-power mode and communicates network traffic to the application 510 in communication 534.

In at least one implementation, the first timeout period 504 may be superseded by the second timeout period 506 when a component of the system receives a signal indicating that the hardware component 516 is active, would not satisfy an inactivity condition, and/or would not satisfy a transition condition at time $T_2$. As such, the first timeout period 504 is "cut off" by the second timeout period 506 once it is known that the hardware component 516 will not transition to the low-power state at the end of the first timeout period 504. In another implementation, the first timeout period 504 may be allowed to run until its expiration even if it is known that the hardware component 516 did not satisfy a transition condition and/or an inactivity condition during the first timeout period 504. Instead, the first timeout period 504 is allowed to persist until it expired, and then the second timeout period 506 begins after the first timeout period 504 has completed.

Figure 6:
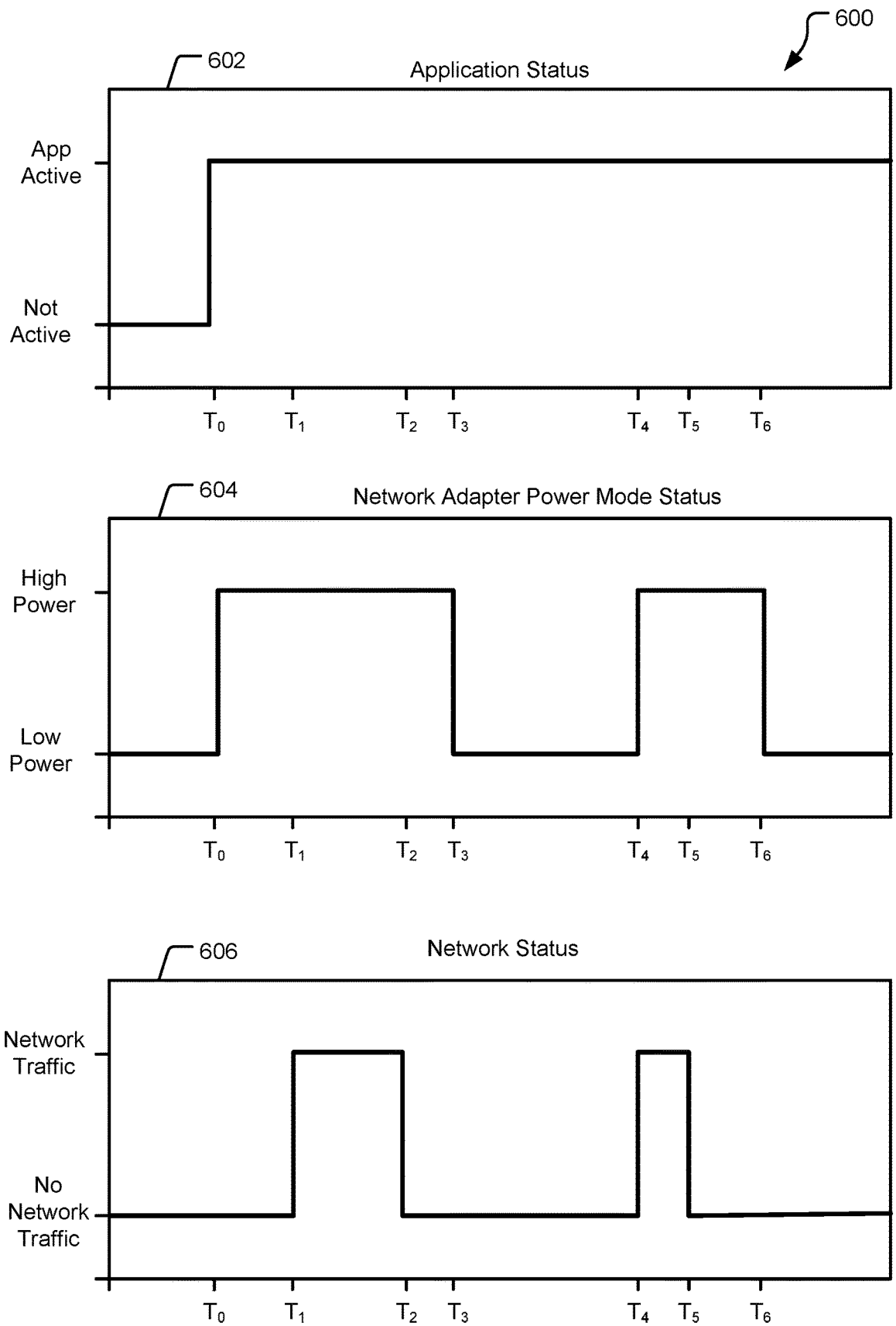
FIG. 6 illustrates plots of example power status of an application, hardware device, and network traffic of a device under supervisory control of power management environment.

FIG. 6 illustrates plots of example power status of an application, hardware device, and network traffic of a device under supervisory control of power management environment 600. In a first plot 602, an application is inactive at the beginning of the plot, becomes active at time $T_0$, and remains active for the remainder of the plot. Plot 604 indicates the power mode status of a hardware component, in this case a network adapter. The network adapter is in a low-power mode until time $T_0$ when the application becomes active and requests use of the network adapter. Plot 606 shows network traffic over the network adapter. Network traffic is present starting at time $T_1$ until time $T_2$. At time $T_2$, network traffic ceases and a timeout period begins for the network adapter. At time $T_3$, the timeout period ends, and the network adapter transitions to a low-power state even though the application is still active and may not have de-registered its use of the network adapter. Later, between times $T_4$ and $T_5$, the network becomes active again and the network adapter transitions to a high-power state to service the network traffic. After time $T_5$, the network traffic again ceases and a timeout period begins for the network adapter, which transitions to a low-power mode again at time $T_6$ even though the application is still active and may not have de-registered its use of the network adapter.

Figure 7:
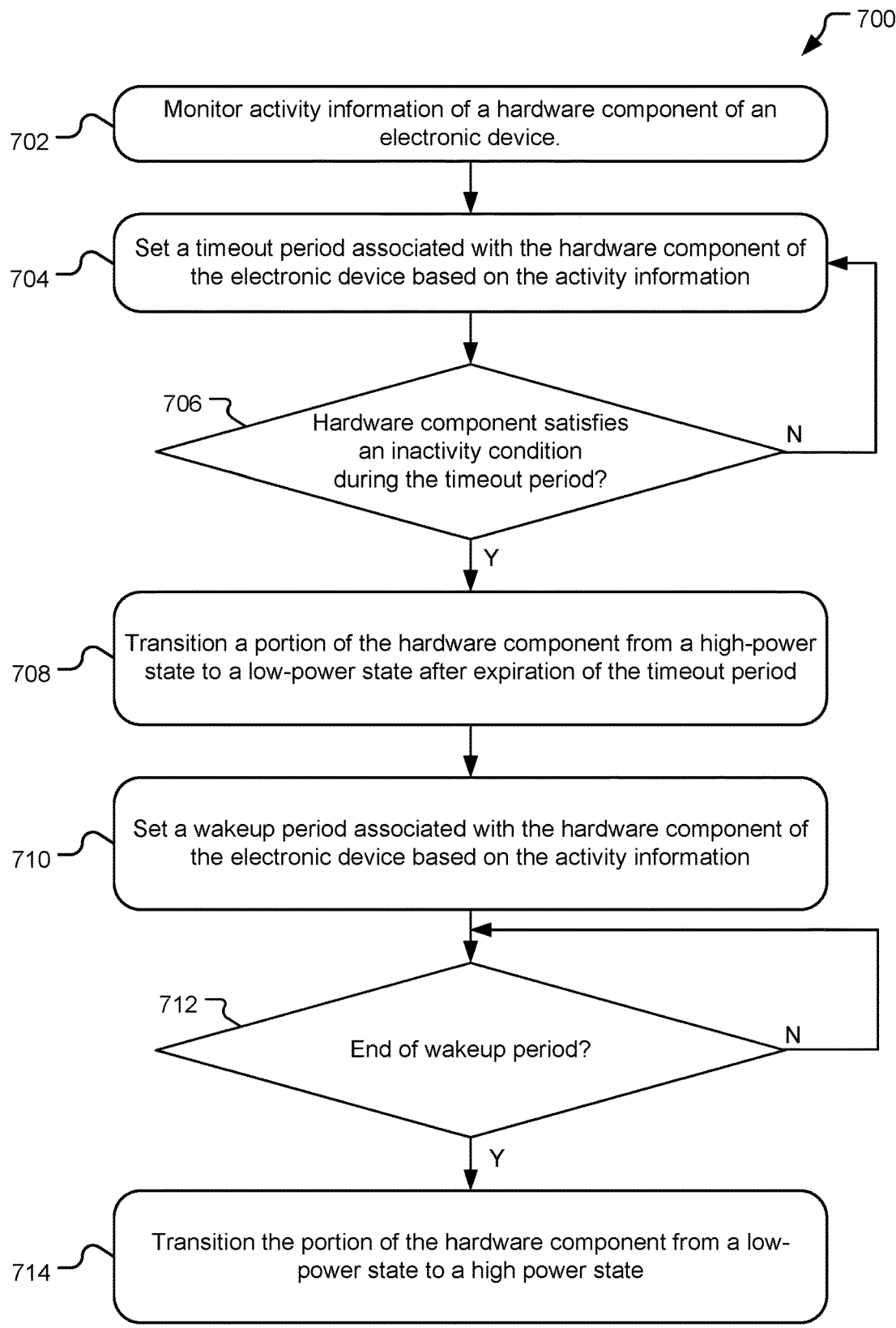
FIG. 7 illustrates a flow diagram showing an example operations for providing supervisory control of power management in a computing device.

FIG. 7 illustrates a flow diagram 700 showing an example operations for providing supervisory control of power management in a computing device. A monitoring operation 702 is to monitor activity information of a hardware component of an electronic device.

Activity information of a hardware component may include various types of information regarding the hardware component. For example, activity information may include load information on the hardware component, a state of the hardware component, and/or a usage level of the hardware component. In an implementation, the hardware component is a network adapter and activity information regarding the network adapter includes at least transmission information, receive information, and control information suitable to change a state of the network adapter such as the network adapter's power state and/or parameters of the network adapter such as MAC address, multicast address, data rate, etc.

The monitoring operation 702 may be performed by a variety of components in an electronic device. In one implementation, a high-level component of an OS such as a power management supervisory controller performs the monitoring operation 702. In another implementation, a low-level component on an OS such as power management arbitrator performs the monitoring operation 702 without recourse to higher levels of the OS. In yet another implementation, other low level components of an OS perform the monitoring operation 702, such as a hardware sublayer, a data link layer component, and/or a hardware driver associated with a hardware component. The monitoring operation 702 may include monitoring activity of the hardware component (e.g., network traffic on a network adapter, frame rate on a video adapter, etc.) as well as monitoring the nature of the activity of the hardware component. For example, the monitoring operation 702 may include monitoring the type of application requesting usage of a hardware component, historical usage data regarding the usage of the hardware component, available battery status on the device, power consumption of the hardware component, feedback from the hardware component itself, user preference data regarding power management preferences, etc.

The setting operation 704 is set a timeout period associated with the hardware component of the electronic device based on the activity information. The setting operation 704 may be performed by a variety of components in an electronic device. In one implementation, a high-level component of an OS such as a power management supervisory controller performs the setting operation 704. In another implementation, a low-level component on an OS such as a power management arbitrator performs the setting operation 704 without recourse to higher levels of the OS. In yet another implementation, other low level components of an OS perform the setting operation 704, such as a hardware sublayer and/or a hardware driver associated with a hardware component. The timeout period set by the setting operation 704 may be shorter if excessive timeouts would degrade the user experience of applications requesting use of the hardware device. For example, a Voice over IP (VoIP) application may miss an incoming call if the incoming call cannot get through a network adapter in a low-power mode. If a VoIP program has requested use of a network adapter hardware component, the timeout period may therefore be set as a relatively short period in the setting operation 704. On the other hand, if a music application has requested to use a network adapter to download songs, then a longer timeout period may be set in the setting operation 704 because the music program is unlikely to need network access after it has downloaded a song and before the next song must be downloaded.

A decision operation 706 decides whether the hardware component satisfies an inactivity condition during the timeout period. In an implementation, satisfying the inactivity condition includes receiving no requests from applications on the computing device to use the hardware component during the timeout period. In another implementation, satisfying the inactivity condition includes performing only certain tasks during the timeout period such as executing a heartbeat function, polling other devices for availability, etc. In yet another implementation, satisfying the inactivity condition includes a level of activity of the hardware device that consumes a limited amount of power. Other standards of hardware component activity or power consumption may also be used to satisfy the inactivity condition in the decision operation 706. If the hardware component does not satisfy the inactivity condition in the decision operation 706, the method returns to operation 704 to set a new timeout period. If the hardware component does satisfy the inactivity condition in the decision operation 706, then the method 700 proceeds to transition operation 708.

In at least one implementation, the decision operation 706 resets a timeout period when there is activity on the hardware component during the timeout period. Resetting the timeout period when there is activity on the hardware component causes the timeout period only to expire when there has been no activity during the timeout period. Alternatively, decision operation 706 may let the timeout period run to the expiration point before checking whether there has been activity on the hardware component during the timeout period. Letting the timeout period run to expiration requires less frequent resetting of timeout periods but may cause the hardware component to go into the low-power state less frequently than resetting the timeout period when there is activity on the hardware component.

The transition operation 708 is transition a portion of the hardware component from a high-power state to a low-power state after expiration of the timeout period. In an implementation, the hardware component is capable of multiple power states (or power modes). The transition operation 708 may therefore include transitioning the hardware component from a high-power state to an intermediate power state or transitioning the hardware component from an intermediate power state to a low-power state.

The setting operation 710 is set a wakeup period associated with the hardware component of the electronic device based on the activity information. Setting operation 710 may be performed by a variety of components in an electronic device. In one implementation, a high-level component of an OS such as a power management supervisory controller performs the setting operation 710. In another implementation, a low-level component on an OS such as a power management arbitrator performs the setting operation 710 without recourse to higher levels of the OS. In yet another implementation, other low level components of an OS perform the setting operation 710, such as a hardware sublayer, a component of the data link layer, and/or a hardware driver associated with a hardware component. The wakeup period set by the setting operation 710 may be shorter if an excessive period of a low-power mode by the hardware component would degrade the user experience of applications requesting use of the hardware device. For example, a Voice over IP (VoIP) application may miss an incoming call if the incoming call cannot get through a network adapter in a low-power mode. If a VoIP program has requested use of a network adapter hardware component, the wakeup period may therefore be set as a relatively short period in the setting operation 710. On the other hand, if a music application has requested to use a network adapter to download songs, then a longer wakeup period may be set in the setting operation 710 because the music program is unlikely to need network access after it has downloaded a song and before the next song must be downloaded, and the music application is not likely to present a degraded user experience if a song cannot be downloaded due to a low-power state of a network adapter when the music application first requests it because the music program may not need continuous network access to play continuous music to the user.

A decision operation 712 determines whether the wakeup period has ended. If the wakeup period has ended at the decision operation 712, then the method proceeds to the transitioning operation 714. The transitioning operation 714 transitions the portion of the hardware component from a low-power state to a high-power state. The transitioning operation 714 may be performed by a variety of components in an electronic device. In one implementation, a high-level component of an OS such as a power management supervisory controller performs the transitioning operation 714. In another implementation, a low-level component on an OS such as a power management arbitrator performs the transitioning operation 714 without recourse to higher levels of the OS. In yet another implementation, other low level components of an OS perform the transition operation 714, such as a hardware sublayer, a component of the data link layer, and/or a hardware driver associated with a hardware component.

In at least one implementation, the transition operation 714 does not completely transition the portion of the hardware component from a low-power state to a high-power state. Instead, the transition operation 714 may merely check whether there are any demands from the applications or OS to use the hardware component. If there are no demands to use the hardware component, then transition operation 714 may allow the hardware component to remain in the low-power state. The order of the steps in method 700 is not limited to the order presented herein. For example, setting operation 704 may set the timeout period independently of the wakeup period in setting operation 710. In another implementation, setting operations 704 and 710 may operate simultaneously.

An example supervisory control method for power management of an electronic device includes monitoring activity information of a hardware component of the electronic device, setting a timeout period associated with the hardware component of the electronic device based on the activity information, the timeout period defining a minimum amount of time before a power state of the hardware component may be transitioned from a higher-power state to a lower-power state, and transitioning at least a portion of the hardware component from the higher-power state to the lower-power state after expiration of the timeout period if the hardware component satisfies a transition condition, the transition condition being dependent at least in part on the activity information and the timeout period.

Another example method of any preceding method includes maintaining the hardware component in the higher-power state after expiration of the timeout period if the hardware component does not satisfy the transition condition during the timeout period.

Another example method of any preceding method includes setting a wakeup period associated with the hardware component of the electronic device based on the activity information, the wakeup period defining a maximum amount of time before a power status of the hardware component may be transitioned from the lower-power state to a different power state, and transitioning the portion of the hardware component from the lower-power state to the different power state after expiration of the wakeup period if the hardware component satisfies a wakeup condition.

Another example method of any preceding method includes wherein the transitioning operation includes determining whether demands on the hardware component justify a transition to the different power state.

Another example method of any preceding method includes wherein the activity information includes information communicated between the hardware component and one or more applications executing on the electronic device.

Another example method of any preceding method includes wherein the transitioning operation transitions a sub-component of the hardware component to a low-power state.

Another example method of any preceding method includes wherein the transition condition is satisfied when there is no monitored activity information during the timeout period and the hardware component is idle at an end of the timeout period.

Another example method of any preceding method includes setting an initial value for the timeout period, and adjusting the initial value of the timeout period for the hardware component of the electronic device from the initial value to a different value based on at least one of the monitored activity information and a type of application using the hardware component.

An example apparatus includes a supervisory power management control system configured to monitor activity information regarding a hardware component of the electronic device, set a timeout period associated with the hardware component, the timeout period defining a minimum amount of time before a power state of the hardware component may be transitioned from a higher-power state to a lower-power state, transition at least a portion of the hardware component to a lower-power state if the hardware component satisfies a transition condition, the transition condition being dependent at least in part on the activity information and the timeout period, and maintain the hardware component in the higher-power state after expiration of the timeout period if the hardware component does not satisfy the transition condition during the timeout period.

An example apparatus of any preceding apparatus includes a power management supervisory controller configured to determine one or more second timeout periods, the one or more second timeout periods based at least in part on applications executing on the electronic device, the power management supervisory controller further configured to communicate the one or more second timeout periods to a power management arbitrator.

An example apparatus of any preceding apparatus includes wherein the power management supervisory controller is further configured to set another timeout period after the expiration of the timeout period if the hardware component does not satisfy the transition condition during the timeout period.

An example apparatus of any preceding apparatus includes wherein the power management supervisory controller is further configured to set a wakeup period associated with the hardware component of the electronic device based on the activity information, the wakeup period defining a minimum amount of time before the power status of the hardware component may be transitioned from the lower-power state to a different power state, and transition the portion of the hardware component from the lower-power state to the different power state after expiration of the wakeup period if the hardware component satisfies a wakeup condition.

An example apparatus of any preceding apparatus includes a hardware interface controller configured to set a timer at a beginning of the timeout period, the hardware interface controller further configured to transit a signal to an arbitrator at the expiration of the timer.

An example apparatus of any preceding apparatus includes wherein the power management supervisory controller is further configured to adjust the wakeup period for the hardware component to a different value after expiration of the wakeup period based on at least one of the activity information monitored during the wakeup period and a type of application using the hardware component.

An example apparatus includes one or more tangible processor-readable storage media embodied with instructions for executing on one or more processors and circuits of a device a process for supervisory power management of an electronic device, the process including monitoring activity information of a hardware component of the electronic device, setting a timeout period for the hardware component of the electronic device, the timeout period having an initial value based on the activity information, and transitioning at least a portion of the hardware component from a higher-power state to a lower-power state after expiration of the timeout period if the hardware component satisfies a transition condition, the transition condition being dependent at least in part on the activity information and the timeout period.

An example apparatus of any preceding apparatus includes wherein the process further includes maintaining the hardware component in the higher-power state after expiration of the timeout period if the hardware component does not satisfy the transition condition during the timeout period.

An example apparatus of any preceding apparatus includes wherein the process further includes setting a wakeup period associated with the hardware component of the electronic device based on the activity information, the wakeup period defining a minimum amount of time before a power status of the hardware component may be transitioned from the lower-power state to a different power state, and transitioning the portion of the hardware component from the lower-power state to the different power state after expiration of the wakeup period if the hardware component satisfies a wakeup condition.

An example apparatus of any preceding apparatus includes wherein the activity information includes information communicated between the hardware component and one or more applications executing on the electronic device.

An example apparatus of any preceding apparatus includes wherein the setting operation comprises setting a wakeup timer on the hardware component, the process further comprising receiving a wakeup signal from the hardware component at an end of the wakeup period if the activity information received while the hardware component is in the low-power state satisfies an activity condition.

An example apparatus of any preceding apparatus includes wherein the transitioning operation transitions a sub-component of the hardware component to the low-power state.

Figure 8:
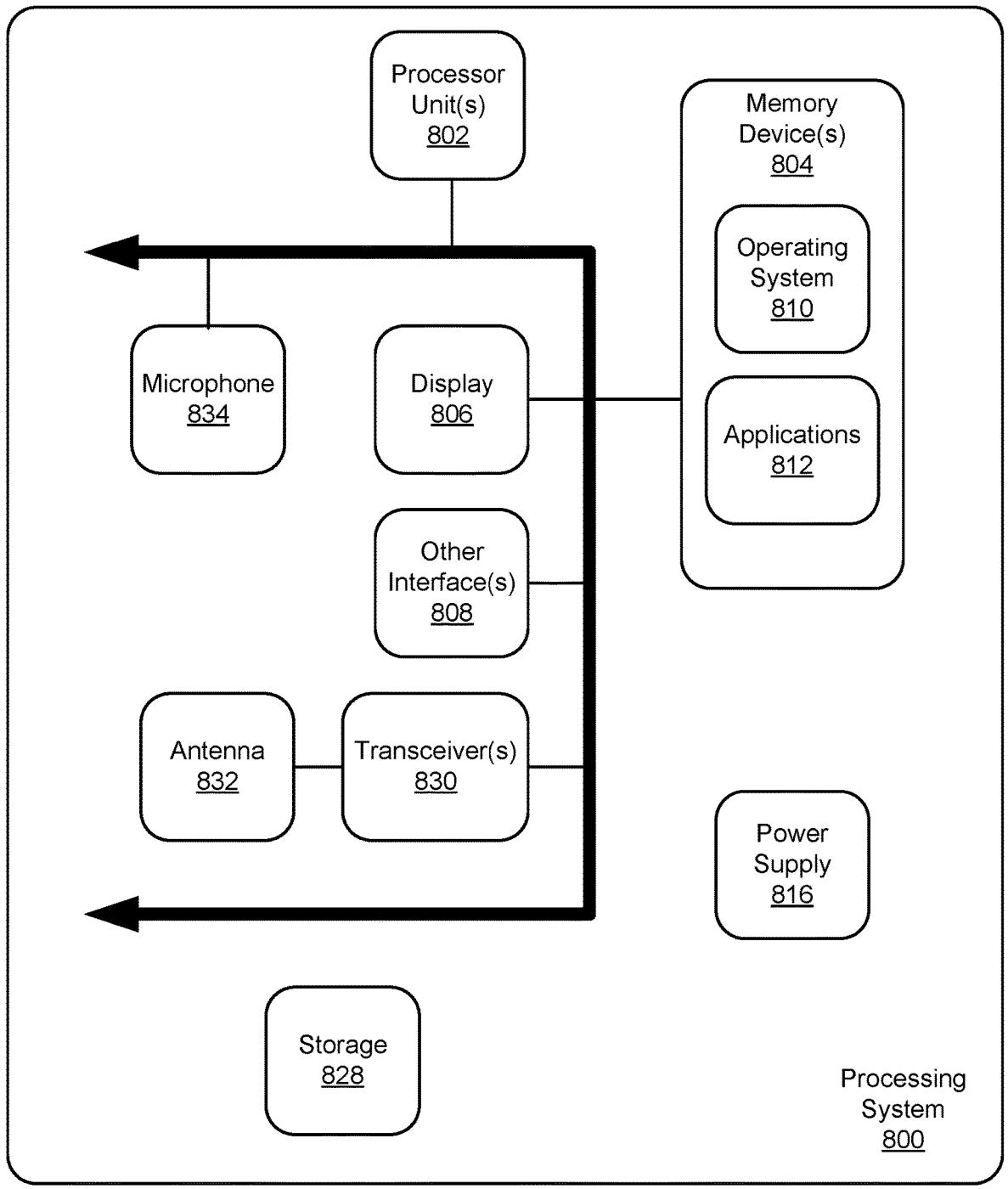
FIG. 8 illustrates an example processing system for use in supervisory control of power management in a computing device.

FIG. 8 illustrates an example processing system 800 enabled to provide a supervisory power management service. The processing system 800 includes processors 802 and memory 804. On memory 804 is stored the power management supervisory controller 206, the power management arbitrator 208, one or more hardware sublayers 210, and/or one or more hardware drivers 212. The processing system may include one or more hardware devices, boxes, or racks, and may be hosted in a network data center.

According to various non-limiting examples, the computing systems described herein includes one or more devices, such as servers, storage devices, tablet computers, laptops, desktop computers, gaming consoles, media players, mobile phones, handheld computers, wearable devices, smart appliances, networking equipment, kiosk devices, and so forth. In one example configuration, the computing systems comprise at least one processor. The computing systems also contain communication connection(s) that allow communications with various other systems. The computing systems also include one or more input devices, such as a keyboard, mouse, pen, voice input device, touch input device, etc., and one or more output devices, such as a display (including a touch-screen display), speakers, printer, etc. coupled communicatively to the processor(s) and computer-readable media via connections such as a bus.

The memory 804 is an example of computer-readable media. Computer-readable media stores computer-executable instructions that are loadable and executable by one or more processor(s), as well as data generated during execution of, and/or usable in conjunction with, these programs.

In the illustrated example, computer-readable media stores OS instances, which provide basic system functionality to applications. One or more of these components, including the operating systems, may be instantiated as virtual machines, application containers, or as some other type of virtualized instantiation.

Processor(s) 802 may include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative examples one or more functions of the present disclosure may be performed or executed by, and without limitation, hardware logic components including Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, examples of the computing systems may include a plurality of processing units of multiple types. For example, the processing units may be a combination of one or more GPGPUs and one or more FPGAs. Different processing units may have different execution models, e.g., as is the case for graphics processing units (GPUs) and central processing units (CPUs).

Depending on the configuration and type of computing device used, computer-readable media (e.g., memory 804) include volatile memory (such as random access memory (RAM)) and/or non-volatile memory (such as read-only memory (ROM), flash memory, 3D XPoint, resistive RAM, etc.). The computer-readable media can also include additional removable storage and/or non-removable storage including, but not limited to, SSD (e.g., flash memory), HDD (Hard Disk Drive) storage or other type of magnetic storage, optical storage, and/or other storage that can provide non-volatile storage of computer-executable instructions, data structures, program modules, and other data for computing systems.

Computer-readable media can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, programming modules, or other data. Computer storage media includes, but is not limited to, phase change memory (PRAM), Resistive RAM, 3D Xpoint non-volatile memory, static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

Various processes described herein are carried out as computing functions in conjunction with networking functions. For example, one computing device or system may cause transmission of a message to another computing device via network communication hardware. This may include, for example, passing by a software module a pointer, argument, or other data to a networking module. The pointer, argument or other data may identify data stored in memory or in a register that is to be transmitted to another computing device. The networking module may include a protocol stack, and may read the data identified by the pointer, argument, or other data. The protocol stack may encapsulate the data in one or more frames, packets, cells, or other data networking protocol structures. The protocol stack (such as within the network power module or elsewhere) may call a network interface device driver, to cause physical transmission of electrical, magnetic, or optical signals along a communication medium to a network element, such as a gateway, router, switch, hub, and so forth. An underlying network may route or switch the data to the destination. The destination computing device may receive the data via a network interface card, which results in an interrupt being presented to a device driver or network adaptor. A processor of the destination computing device passes the device driver an execution thread, which causes a protocol stack to de-encapsulate the data in the packets, frames, and cells in which the data was received. The protocol stack causes the received data to be stored in a memory, a register, or other location. The protocol stack may pass a pointer, argument, or other data that identifies where the received data is stored to a destination software module executing on the destination computing device. The software module receives an execution thread along with the argument, pointer, or other data, and reads the data from the identified location.

The processing system 800 may also include a display 806 (e.g., a touchscreen display, an OLED display with photodetectors, etc.), and other interfaces 808 (e.g., a keyboard interface). The memory device 804 generally includes both volatile memory (e.g., RAM) and non-volatile memory (e.g., flash memory). An OS 810, such as one of the varieties of the Microsoft Windows® operating system, resides in the memory device 804 and is executed by at least one of the processor units 802, although it should be understood that other operating systems may be employed. Other features of the processing system 800 may include without limitation an image sensor, a sensing trigger (e.g., a pressure sensor or a proximity sensor), etc.

One or more applications 812, such as power management software, power management user preference software, hardware power mode control software, etc., are loaded in the memory device 804 and executed on the OS 810 by at least one of the processor units 802. The processing system 800 includes a power supply 816, which is powered by one or more batteries and/or other power sources and which provides power to other components of the processing system 800. The power supply 816 may also be connected to an external power source that overrides or recharges the built-in batteries or other power sources.

The processing system 800 includes one or more communication transceivers 830 to provide network connectivity (e.g., mobile phone network, Wi-Fi®, BlueTooth®, etc.). The processing system 800 also includes various other components, such as a positioning system 820 (e.g., a global positioning satellite transceiver), one or more audio interfaces 834 (e.g., such a microphone, an audio amplifier and speaker and/or audio jack), one or more antennas 832, and additional storage 828. Other configurations may also be employed.

In an example implementation, a mobile operating system, various applications, modules for power management and device control (e.g., drivers, communication stack layers and/or sublayers), and other modules and services may be embodied by instructions stored in the memory device 804 and/or storage devices 828 and processed by the processing unit 802. Timeout periods, wakeup periods, and other data may be stored in the memory device 804 and/or storage devices 828 as persistent datastores.

The processing system 800 may include a variety of tangible processor-readable storage media and intangible processor-readable communication signals. Tangible processor-readable storage can be embodied by any available media that can be accessed by the processing system 800 and includes both volatile and nonvolatile storage media, removable and non-removable storage media. Tangible processor-readable storage media excludes intangible communication signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 800. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, OS software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a processor, cause the processor to perform methods and/or operations in accordance with the described implementations. The executable processor program instructions may include any suitable type of code, such as source code, compiled code, interpreted code, executable code, static code, dynamic code, and the like. The executable processor program instructions may be implemented according to a predefined processor language, manner or syntax, for instructing a processor to perform a certain operation segment. The instructions may be implemented using any suitable high-level, low-level, object-oriented, visual, compiled and/or interpreted programming language.

The implementations described herein are implemented as logical steps in one or more processor systems. The logical operations may be implemented (1) as a sequence of processor-implemented steps executing in one or more processor systems and (2) as interconnected machine or circuit modules within one or more processor systems. The implementation is a matter of choice, dependent on the performance requirements of the processor system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method for controlling power management of an electronic device, the method comprising:
monitoring use information for a hardware component of the electronic device, the use information associated with an application registered to use the hardware component;
determining, based at least in part on the use information, that the hardware component is idle and that the application remains registered to use the hardware component;
in response to determining that the hardware component is idle and that the application remains registered to use the hardware component, determining a timeout period associated with the hardware component, the timeout period defining an amount of time for the hardware component to be idle before the hardware component transitions from a first power state to a second power state that consumes less power than the first power state;
determining that the timeout period has expired and that the hardware component has remained idle during the timeout period; and
in response to determining that the timeout period has expired and that the hardware component has remained idle during the timeout period, transitioning the hardware component from the first power state to the second power state.

2. The method of claim 1, further comprising:
determining a wakeup period associated with the hardware component, the wakeup period defining a maximum amount of time before the hardware transitions from the second power state to a different power state; and transitioning the hardware component from the second power state to the different power state after expiration of the wakeup period.

3. The method of claim 2, wherein the transitioning the hardware component from the second power state to the different power state includes determining that demands on the hardware component justify a transition to the different power state.

4. The method of claim 2, wherein the different power state comprises the first power state.

5. The method of claim 1, wherein the use information includes communications between the hardware component and the application.

6. The method of claim 1, wherein the transitioning the hardware component from the first power state to the second power state transitions a sub-component of the hardware component from the first power state to the second power state.

7. The method of claim 1, further comprising adjusting the amount of time defined by the timeout period based on at least one of the use information or a type of the application.

8. The method of claim 1, wherein the amount of time defined by the timeout period is determined based on a type of the application.

9. A system for power management, the system comprising:
 a hardware component;
 a processing unit; and
 memory storing instructions that, when executed, cause the system to perform operations comprising:
  monitoring use information for the hardware component, the use information associated with an application registered to use the hardware component;
  determining, based at least in part on the use information, that the hardware component is idle and that the application remains registered to use the hardware component;
  in response to determining that the hardware component is idle and that the application remains registered to use the hardware component, determining that a timeout period associated with the hardware component has expired and that the hardware component has remained idle during the timeout period, the timeout period defining an amount of time for the hardware component to be idle before the hardware component transitions from a first power state to a second power state that consumes less power than the first power state; and
  transitioning the hardware component from the first power state to the second power state after determining that the timeout period has expired and that the hardware component has remained idle during the timeout period.

10. The system of claim 9, wherein the operations further comprise:
 determining a wakeup period associated with the hardware component, the wakeup period defining a maximum amount of time before the hardware transitions from the second power state to a different power state; and
 transitioning the hardware component from the second power state to the different power state after expiration of the wakeup period.

11. The system of claim 10, wherein the transitioning the hardware component from the second power state to the different power state includes determining that demands on the hardware component justify a transition to the different power state.

12. The system of claim 10, wherein the different power state comprises the first power state.

13. The system of claim 9, wherein the use information includes communications between the hardware component and the application.

14. The system of claim 9, wherein the transitioning the hardware component from the first power state to the second power state transitions a sub-component of the hardware component from the first power state to the second power state.

15. The system of claim 9, wherein the operations further comprise adjusting the amount of time defined by the timeout period based on at least one of the use information or a type of the application.

16. The system of claim 9, wherein the amount of time defined by the timeout period is determined based on a type of the application.

17. One or more tangible processor-readable storage media embodied with instructions that, when executed by a processing unit, cause an electronic device to perform operations comprising:
 monitoring use information for the hardware component, the use information associated with an application registered to use the hardware component;
 determining, based at least in part on the use information, that the hardware component is idle and that the application remains registered to use the hardware component;
 in response to determining that the hardware component is idle and that the application remains registered to use the hardware component, determining a timeout period associated with the hardware component, the timeout period defining an amount of time for the hardware component to be idle before the hardware component transitions from a first power state to a second power state that consumes less power than the first power state;
 determining that the timeout period has expired and that the hardware component has remained idle during the timeout period; and
 transitioning the hardware component from the first power state to the second power state after determining that the timeout period has expired and that the hardware component has remained idle during the timeout period.

18. The one or more tangible processor-readable storage media of claim 17, wherein the operations further comprise:
 determining a wakeup period associated with the hardware component, the wakeup period defining a maximum amount of time before the hardware transitions from the second power state to a different power state; and
 transitioning the hardware component from the second power state to the different power state after expiration of the wakeup period.

19. The one or more tangible processor-readable storage media of claim 17, wherein the operations further comprise adjusting the amount of time defined by the timeout period based on at least one of the use information or a type of the application.

20. The one or more tangible processor-readable storage media of claim 17, wherein the amount of time defined by the timeout period is determined based on a type of the application.

* * * * *